(12) United States Patent  
Soofer (10) Patent No.: US 9,970,612 B2  
(45) Date of Patent: May 15, 2018

(54) DECORATIVE LIGHTING

(71) Applicant: Alpine Corporation, Los Angeles, CA (US)

(72) Inventor: Sohrab Soofer, Beverly Hills, CA (US)

( * ) Notice: Subject to any disclaimer, the term of this patent is extended or adjusted under 35 U.S.C. 154(b) by 157 days.

(21) Appl. No.: 14/475,480

(22) Filed: Sep. 2, 2014

(65) Prior Publication Data

US 2015/0292696 A1 Oct. 15, 2015

Related U.S. Application Data

(60) Provisional application No. 61/979,439, filed on Apr. 14, 2014.

(51) Int. Cl.
| | |
|---|---|
| *F21S 9/00* | (2006.01) |
| *F21S 9/03* | (2006.01) |
| *F21V 8/00* | (2006.01) |
| *F21W 121/00* | (2006.01) |
| *F21W 121/04* | (2006.01) |
| *F21Y 103/10* | (2016.01) |
| *F21Y 115/10* | (2016.01) |
| *F21Y 113/20* | (2016.01) |

(52) U.S. Cl.
CPC ............ *F21S 9/035* (2013.01); *G02B 6/0008* (2013.01); *F21W 2121/006* (2013.01); *F21W 2121/04* (2013.01); *F21Y 2103/10* (2016.08); *F21Y 2113/20* (2016.08); *F21Y 2115/10* (2016.08)

(58) Field of Classification Search
CPC combination set(s) only.
See application file for complete search history.

(56) References Cited

U.S. PATENT DOCUMENTS

| | | | | |
|---|---|---|---|---|
| 2005/0052883 A1* | 3/2005 | Qi | .......................... | A47G 33/06 362/555 |
| 2005/0162850 A1* | 7/2005 | Luk | ........................ | F21S 4/26 362/227 |
| 2005/0248934 A1* | 11/2005 | Weiser | .................... | F21S 9/035 362/124 |
| 2008/0285299 A1* | 11/2008 | Ip | ........................ | F21V 21/0824 362/554 |
| 2010/0271815 A1* | 10/2010 | Gomez | .................... | F21S 6/001 362/184 |
| 2012/0113625 A1* | 5/2012 | Werner | .................... | F21L 4/08 362/183 |
| 2014/0261216 A1* | 9/2014 | Fosburg | ................. | A01K 63/06 119/267 |

(Continued)

*Primary Examiner* — Sean Gramling
*Assistant Examiner* — Gerald J Sufleta, II
(74) *Attorney, Agent, or Firm* — Payam Moradian (57) ABSTRACT

Provided is a decorative light with a tubular body having a bundle of optical fibers, one or more light sources, powered by a rechargeable battery and a solar panel which charges the rechargeable battery. Also provided is a decorative light with a tubular body having a plurality of light sources on a strip, an integrated circuit chip for controlling the timing of the light sources, powered by a rechargeable battery and a solar panel which charges the rechargeable battery. The decorative light can receive a transparent or translucent decorative element, such as an animal, mesh ball, snowflake, or a Christmas tree. The light sources are placed in electronic communication via a switching mechanism with the solar panel, the rechargeable battery, and an optional external source of electricity.

12 Claims, 11 Drawing Sheets

(56) References Cited

U.S. PATENT DOCUMENTS

2014/0320064 A1\* 10/2014 Chien .................... A63H 3/003
   320/107
2015/0117001 A1\* 4/2015 Fan ....................... F21V 23/001
   362/235

\* cited by examiner

DECORATIVE LIGHTING

CROSS-REFERENCE

The present application claims the benefit of provisional patent application No. 61/979,439 filed on Apr. 14, 2014 which is incorporated herein by reference in its entirety.

FIELD OF THE INVENTION

The present invention relates generally to decorative lighting, and more particularly to decorative lighting using optical fibers, light-emitting diodes (LEDs), and solar panels, with interchangeable decorative elements.

BACKGROUND SECTION OF THE INVENTION

Decorative lights are widely used during holidays and special occasions in an exterior or interior environment. While interior lighting adds to the value and aesthetic appeal of the inside of a home, exterior lighting is generally used to increase appeal outside the home, such as through porch lights, in-ground patio lights, or pathway lights. Exterior decorative lights may be wired to the electricity found in the home, but if wiring is not desired, they may also remain outside and receive power from solar panels. These lights must also account for outside weather conditions such as rain. Therefore, there is a great need for exterior decorative lights that can be illuminated at night and be rechargeable, weatherproof, and appealing. To have such appeal, there is a need for more than simple decorative lights, but rather decorative lights that are intriguing and aesthetically unique with different and unusual design elements.

SUMMARY SECTION OF THE INVENTION

Provided is a decorative light comprising: a) a transparent or translucent hollow tubular body; b) a lighting-related element inside the tubular body selected from the group consisting of: i. a bundle of optical fibers for transmission of light placed in optical relationship with one or more of first light sources; and ii. a plurality of second light sources attached to a strip; c) a solar panel; and d) a rechargeable battery, that is recharged by the solar panel, for powering one or more of the light sources; wherein the first light source generates light for transmission by the optical fibers and the second light source generates light based on a predetermined criteria. The lighting element can be the bundle of optical fibers with the first light source. The lighting element can be the second light source on the strip. The decorative light can comprise an integrated circuit chip for controlling the timing of the plurality of light sources. The one or more of first light sources can be hidden from view. The tubular body can have a top end and a bottom end, and wherein a first connector for receiving a transparent or translucent decorative element is placed at the top end of the tubular body. The one or more third light sources can be placed at the first connector in electronic communication with the rechargeable battery. A metal wire can electronically connect the rechargeable battery to the one or more third light sources. The one or more third light sources can be directly connected to the strip with a wire. The decorative light can further receive a transparent or translucent decorative element that is illuminated by the one or more third light sources at the first connector. The decorative element can be an animal, a ball, or a snow flake. The decorative element can be a Christmas tree. The tree can be made from plurality of optical fibers that branch out. The bottom of the tree can be received by an annular receptor that accepts the trunk of the tree, with the optical fibers of the tree being in optical communication with a light source attached to a tubular connector placed at the top end of the tube. The bundle of optical fibers can be selected, the optical fibers that comprise the bundle of optical fibers terminate at different lengths. The light sources on the strip can be capable of producing multiple colors. The decorative light can comprise a port for receiving an external source of electricity.

Provided is a Christmas tree decorative element comprising: a. a plurality of optical fibers that branch out; b. a tree trunk; and c. an annular receptor that accepts the trunk of the tree; wherein the optical fibers of the tree are in optical communication with an external light source in proximity to the annular receptor.

Provided is a switching circuit comprising: a. a solar panel; b. a rechargeable battery connectable to the solar panel via a first switch, wherein closing the first switch allows the solar panel to charge the rechargeable battery; c. a light source connectable to the rechargeable battery via a second switch, wherein closing the second switch and opening the first switch allows the rechargeable battery to power the light source; d. an external on-off switch that controls whether the light source is powered; e. an electrical port in electronic communication with the circuit for receiving an external source of electricity, the electrical port connectable to the light source via the external on-off switch, wherein closing the external on-off switch allows the external source of electricity to power the light source; wherein, if the external on-off switch is switched on, and if the solar panel is generating a minimum threshold voltage from external light, then the solar panel is connected to the rechargeable battery via the first switch, and the light source is disconnected from the rechargeable battery via the second switch, such that the solar panel can charge the rechargeable battery without powering the light source; wherein, if the external on-off switch is switched on, and if the solar panel is not generating a minimum threshold voltage from external light, then the solar panel is disconnected from the light source via the first switch, and the rechargeable battery is connected to the light source via the second switch, such that the rechargeable battery powers the light source; wherein, if the external on-off switch is switched on, and if an external source of electricity is connected to the electrical port, then the solar panel is disconnected from the light source via the first switch, the rechargeable battery is connected to the light source via the second switch, and the electrical port is connected to the light source via the external on-off switch, such that the external source of electricity powers one or more of the light source and the rechargeable battery; and wherein, if the external on-off switch is switched off, then the light source is disconnected from the circuit via the on-off switch such that power cannot reach the light source.

20. The switching circuit of claim 19, wherein if the external on-off switch is switched on, and if an external source of electricity is connected to the electrical port, then the solar panel is disconnected from the light source via the first switch, the rechargeable battery is disconnected from the light source via the second switch, and the electrical port is connected to the light source via the external on-off switch, such that the external source of electricity powers the light source.

21. The switching circuit of claim 19, wherein the first switch is incorporated into a first dual switch, and the second switch is incorporated into a second dual switch.

DETAILED DESCRIPTION OF THE INVENTION

Figure 1:
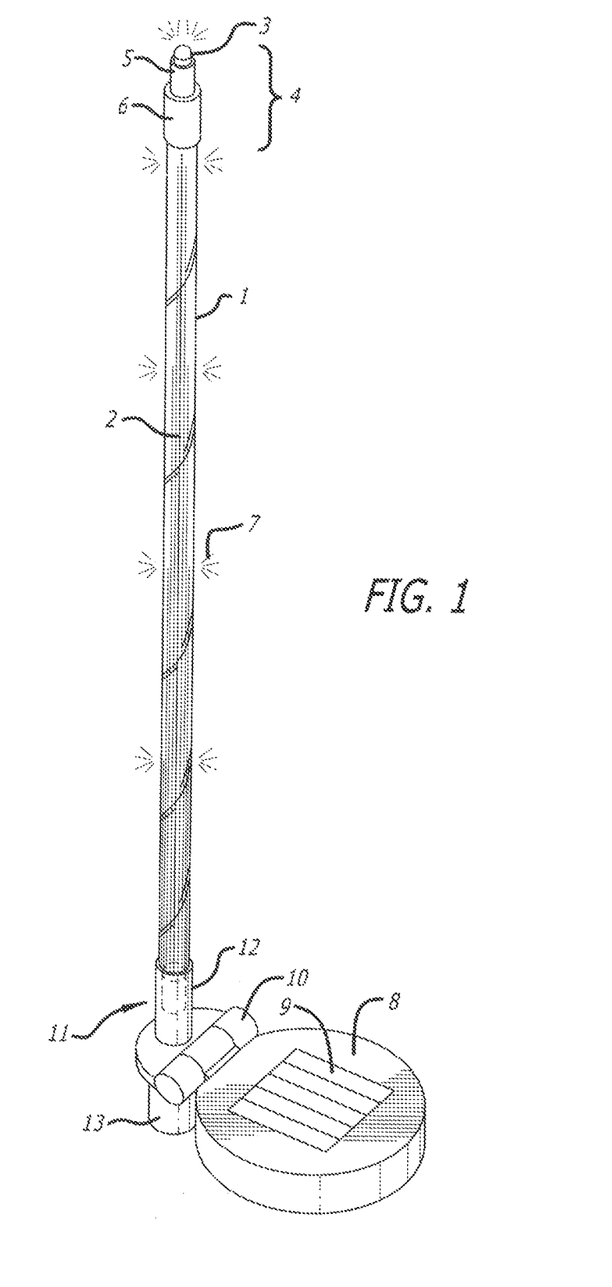
FIG. 1 illustrates a perspective view of an embodiment of a decorative lighting fixture having optical fibers.

FIG. 1 illustrates an embodiment of a decorative lighting fixture. Illustrated is a transparent or translucent tube body (1) with a plurality of optic fibers (2) placed inside the tube body (1) and running substantially with the tube (1). A bundle of optical fibers (2) of various desired lengths is placed inside the tube (1), the optic fibers (2) in the bundle being of a variety of different lengths so that light is produced at several points along the tube (1).

A first connector (4) with a hollow center can be attached to the top of the tube (1). In this embodiment, the first connector (1) has a first tubular part (6) with a hollow center for accepting the top end of the tube (1). The first tubular part (6) can seal the tube (1) from external elements such as water. In another embodiment, the first tubular part (6) can fit inside and seal the top end of the tube (1). The first connector (4) can also have a second tubular part (5) connected to the first tubular part (6). The second tubular part (5) can be used for attaching a decorative element (18). In another embodiment, the second tubular part (5) and first tubular part (6) can be reversed, so that the second tubular part (5) accepts the tube (1) and the first tubular part (6) can be used for attaching a decorative element (18). The first connector (4) can also have a light source (3), such as a light-emitting diode (LED). When a decorative element (18) is attached to the first connector (4), the light source (3) lights up the decorative element (18). The decorative element (18) also insulates the light source (3) from water.

The first connector (4) can be made of a first tubular part (6) and a second tubular part (5) that touch at ends to each other in a manner where the two tubular parts share a common axis. The first connector (4) can have a hollow center. The diameter of the first tubular part (6) can be larger than the diameter of the second tubular part (5). The first tubular part (6) can receive the tube (1). The second tubular part (5) can hold in its center a light source (3), such as a light emitting diode (LED) or any other type of light. The light source (3) can be electronically connected through a metal wire that passes through the hollow center of the first connector (4). A decorative element (18) receives the second tubular part (5) in such manner that decorative element (18) and the first connector (4) form a smooth cylinder with a single diameter.

A separate metal wire, such as a copper wire, can be used to electronically connect the light source (3) at the first connector (4) to a rechargeable battery (40). The rechargeable battery (40) can be housed within a solar panel housing (8) having a solar panel (9) that is connected to the bottom of the tube (1). The metal wire can run from the light source (3) at the top end of the tube (1) along the tube (1) to the bottom end of the tube (1), and into the solar panel housing (8) which houses the rechargeable battery (40).

Figure 9:
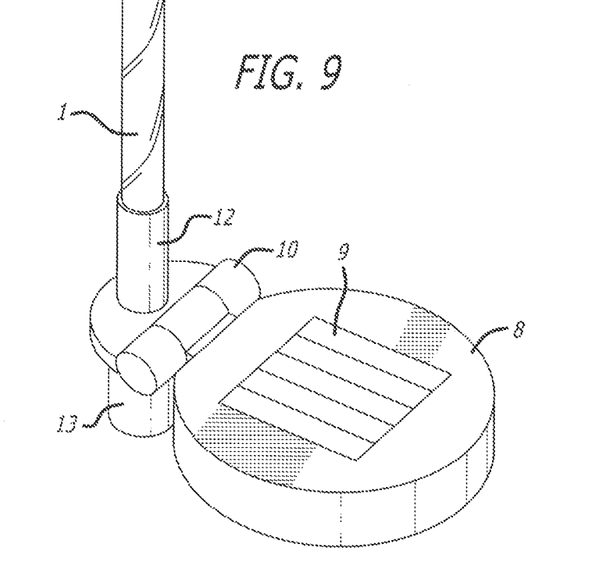
FIG. 9 illustrates a perspective view of a solar panel that is attached to the decorative lighting fixture.

As shown in FIGS. 1 and 9, a second connector (11) can be attached to the bottom end of the tube (1). The second connector (11) can have a receiving tubular part (12) for accepting the tube (1). The receiving tubular part (12) can seal the tube (1) from external elements such as water. The second connector (11) can be connected to a solar panel housing (8) using a hinge (10). The hinge (10) allows the solar panel housing (8) to pivotably rotate in a direction towards and away from the tube (1). When lighting conditions are low, an automatic switch inside the solar panel housing (8) activates and turns on the decorative lighting fixture, which relies on the power of the rechargeable battery (40).

The bundle of optical fibers (2) can be optically connected to a second light source (17) that is placed inside of the second connector (11). The second light source (17), such as a light-emitting diode (LED), can be placed facing upright and hidden from view in the second connector (11), which is typically made from opaque plastic. In one embodiment, the second light source (17) can be placed inside the receiving tubular part (12). A separate metal wire can electronically connect the second light source (51) to the rechargeable battery (40). When the second light source (17) is powered by the rechargeable battery (40), the second light source (17) illuminates. The bundle of optical fibers (2) then transmits the light from the second light source (17) upwards along the tube (1).

Figure 10:
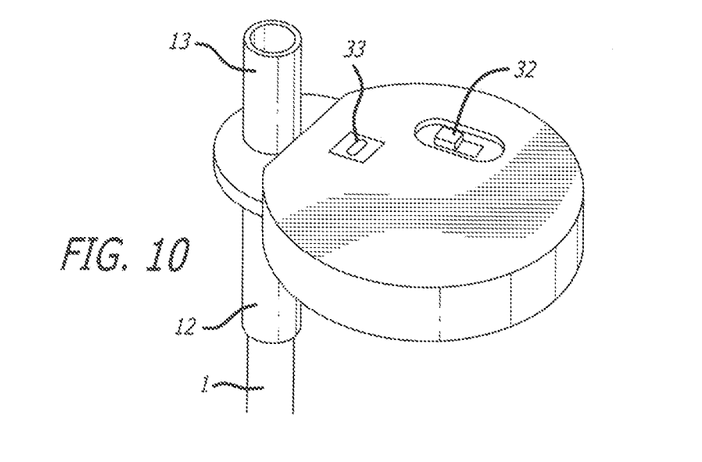
FIG. 10 illustrates a perspective view of the bottom side of the solar panel of FIG. 9 having an on-off button.
Figure 12:
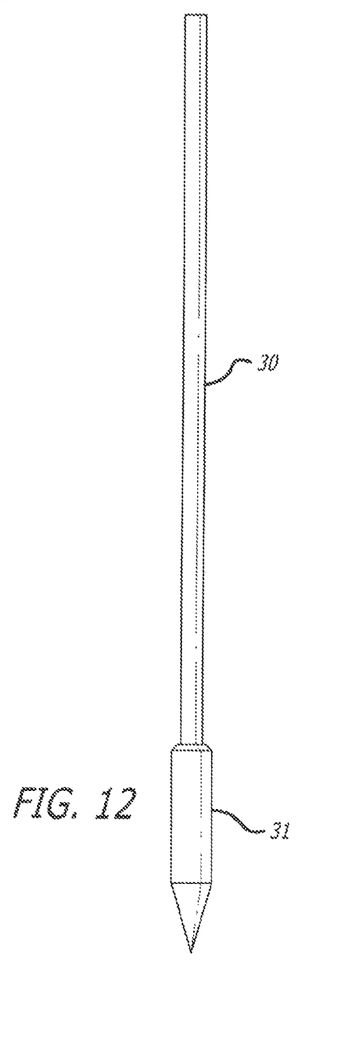
FIG. 12 illustrates a perspective view of a stake that attaches the decorative light fixture to the ground.

As shown in FIGS. 1, 10 and 12, the second connector (11) can also include a stake tubular receptor (13) that can accept and hold a stake (30). The stake (30) can include a piercing portion (31). When the stake (30) is lodged into the stake tubular receptor (13), the decorative lighting fixture can be fixedly driven into the ground.

Figure 2:
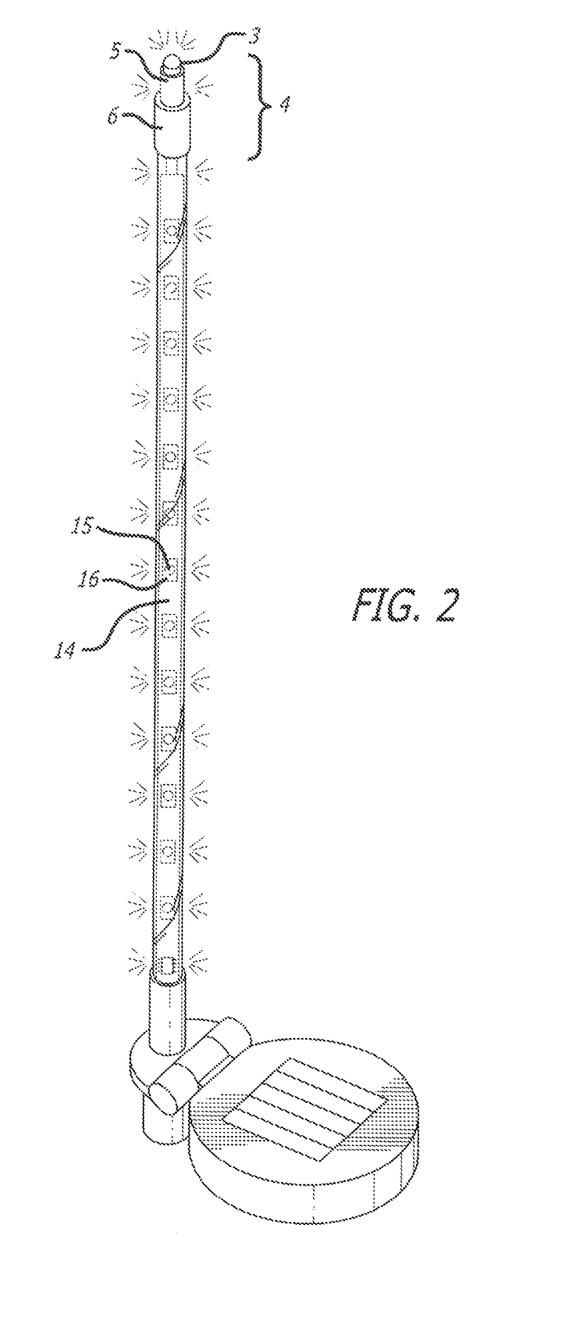
FIG. 2 illustrates a perspective view of another embodiment of a decorative lighting fixture having a strip with a plurality of strip light sources.

FIG. 2 illustrates another embodiment similar to that in FIG. 1, except that a strip (14) is placed in lieu of a bundle of optical fibers (2) inside the tube (1), the strip (14) having a plurality of strip light sources (15) positioned in vertical relationship to each other. The strip light sources (15) can be light-emitting diodes (LEDs) or other sources of light. The strip light sources (15) can be electronically connected to the strip (14) using metal wires. The strip (14) can have a flash control integrated circuit chip (herein after a "flash control IC") that is used to program a lighting effect in the strip (14). The flash control IC can be programmed and used to control and light up, in a step-by-step flashing mode, each strip light source (15) starting from the bottom of the tube (1) and moving upwards. The lighting effect is programmed to go from the bottom of the tube (1) to the top of the tube (1) in predetermined time intervals (i.e. T1, T2, T3, etc). When the light reaches the top, it lights up the light source (3) (such as an LED bulb) at the top of the first connector (4). In one embodiment, the strip light sources (15) produce a single color, while in another embodiment, each strip light source (15) is capable of producing multiple colors. In another embodiment, strip light sources (15) with at least two different colors are used. The flash control IC is electronically connected to and powered by the rechargeable battery (40). When an internal switch and/or an external switch is turned on, the flash control IC is activated. The strip (14) can have openings (16) that allow each strip light source (15) to be visible from both opposite sides of the strip (14).

Figures 7, 7A:
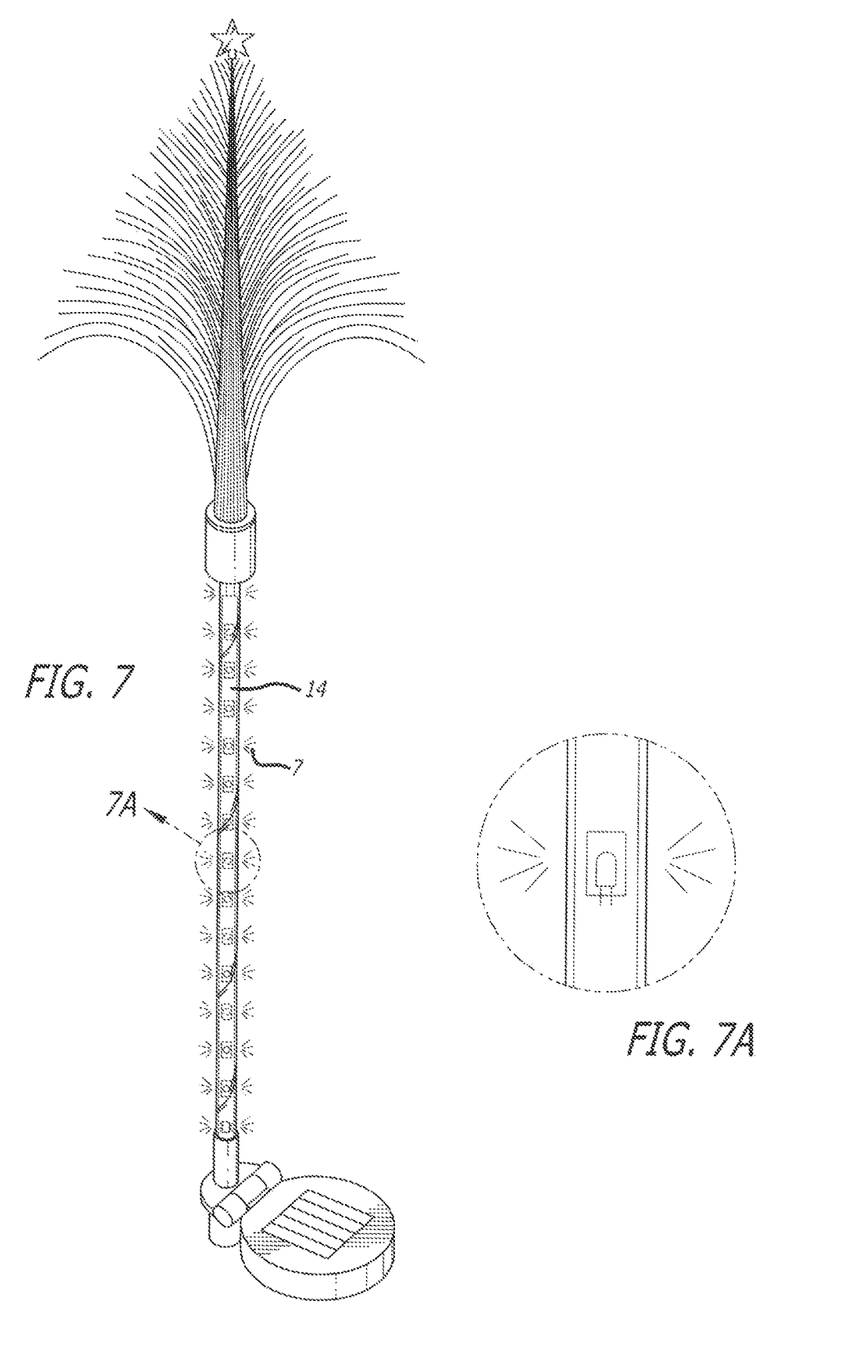
FIG. 7 illustrates a perspective view of the Christmas tree decorative element of FIG. 6 connected to the decorative lighting fixture of FIG. 2.
FIG. 7A illustrates a close-up front side view of one of the plurality of strip light sources in the strip of the decorative lighting fixture of FIG. 7.

FIG. 7A is a close-up view of a strip light source (15) (such as an LED light) on a strip (14). The strip light source (15) is placed against or in an opening (16) in the strip (14) and is electronically connected to the strip (14) with metal wires.

Figure 3:
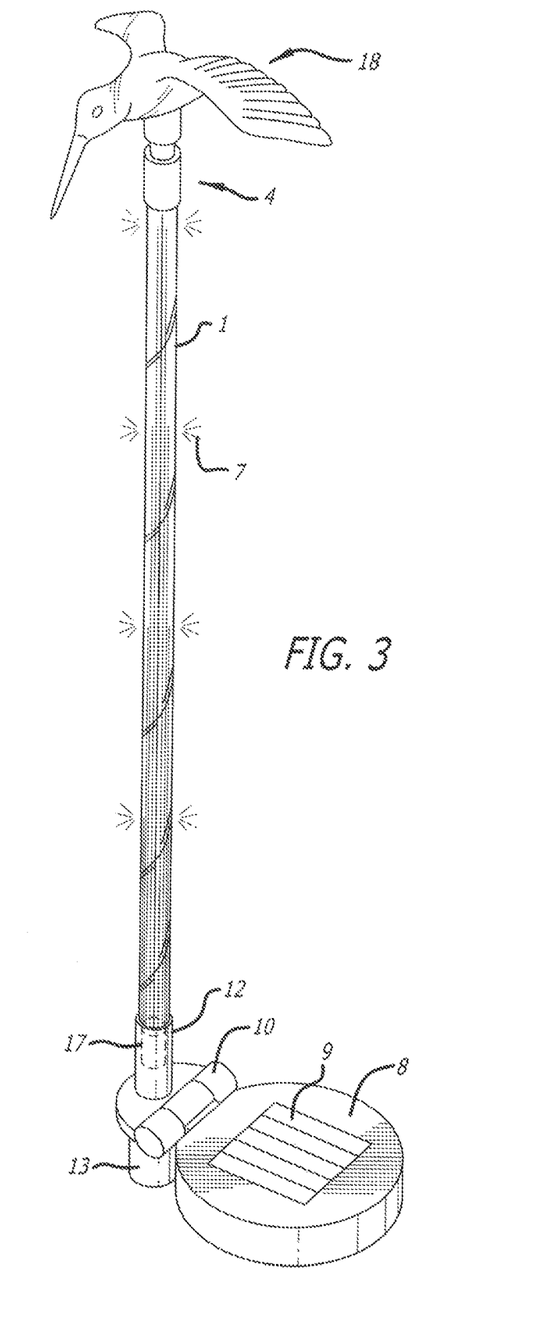
FIG. 3 illustrates a perspective view of the embodiment of FIG. 1 having a decorative element (here a bird, although other animals can be used) that is transparent or translucent.

FIG. 3 illustrates the decorative lighting fixture of FIG. 1 further including a decorative element (18) (here in the form of a bird, although other animals and objects can be used) that is transparent or translucent. The decorative element (18) detachably connects to the second tubular part (5) of the first connector (4). The light source (3) at the top of the first connector (4) lights up the inside of the decorative element (18). The decorative element (18) can be attached in a similar fashion to the tube (1) of FIG. 2.

Figure 4:
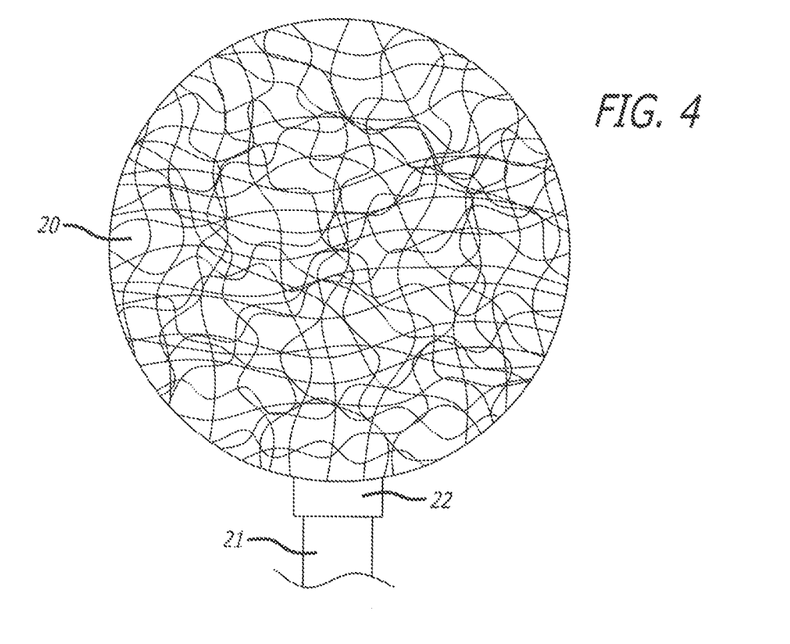
FIG. 4 illustrates a perspective view of a decorative element in the form of a mesh ball.

FIG. 4A illustrates another decorative element (18) in the form of a decorative mesh ball (53). The decorative mesh ball (53) is made up of transparent or translucent material, and can be surrounded by a wire mesh. The decorative mesh ball (53) detachably connects to the second tubular part (5) of the first connector (4). The light source (3) at the top of the first connector (4) lights up the inside of the decorative mesh ball (53). The decorative mesh ball (53) can be attached in a similar fashion to the tube (1) of FIG. 2.

Figure 15:
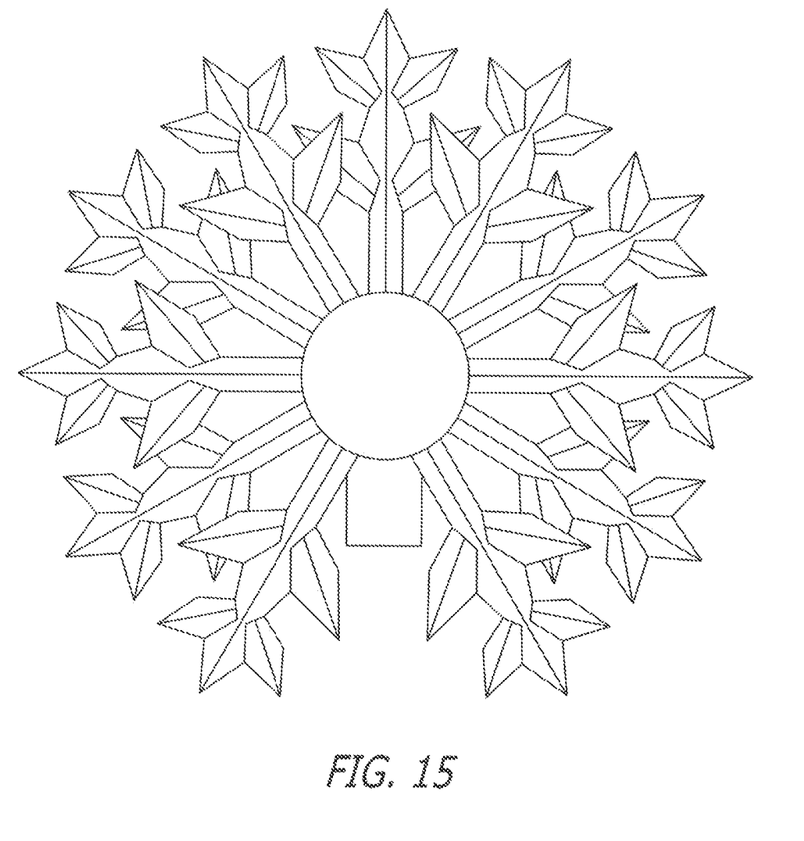
FIG. 15 illustrates a perspective view of a decorative element in the form of a snowflake.

FIG. 15 illustrates another decorative element (18) in the form of a decorative snowflake. The decorative snowflake is made up of transparent or translucent material. The decorative snowflake (54) detachably connects to the second tubular part (5) of the first connector (4). The light source (3) at the top of the first connector (4) lights up the inside of the decorative snowflake. The decorative snowflake can be attached in a similar fashion to the tube (1) of FIG. 2.

Figure 5:
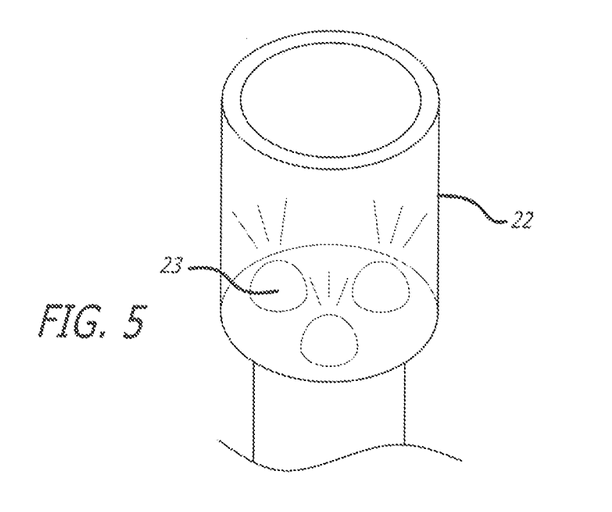
FIG. 5 illustrates a perspective view of a tubular connector for receiving a decorative element.

FIG. 5 illustrates a tubular connector (22) that can receive a decorative element (18). In the decorative lighting fixtures of FIGS. 1 and 2, the tubular connector (22) can be connected to the top end of the tube (1) in lieu of the first connector (4). In this embodiment, a plurality of light sources (23) (three illustrated) are placed in the tubular connector (22).

Figure 6:
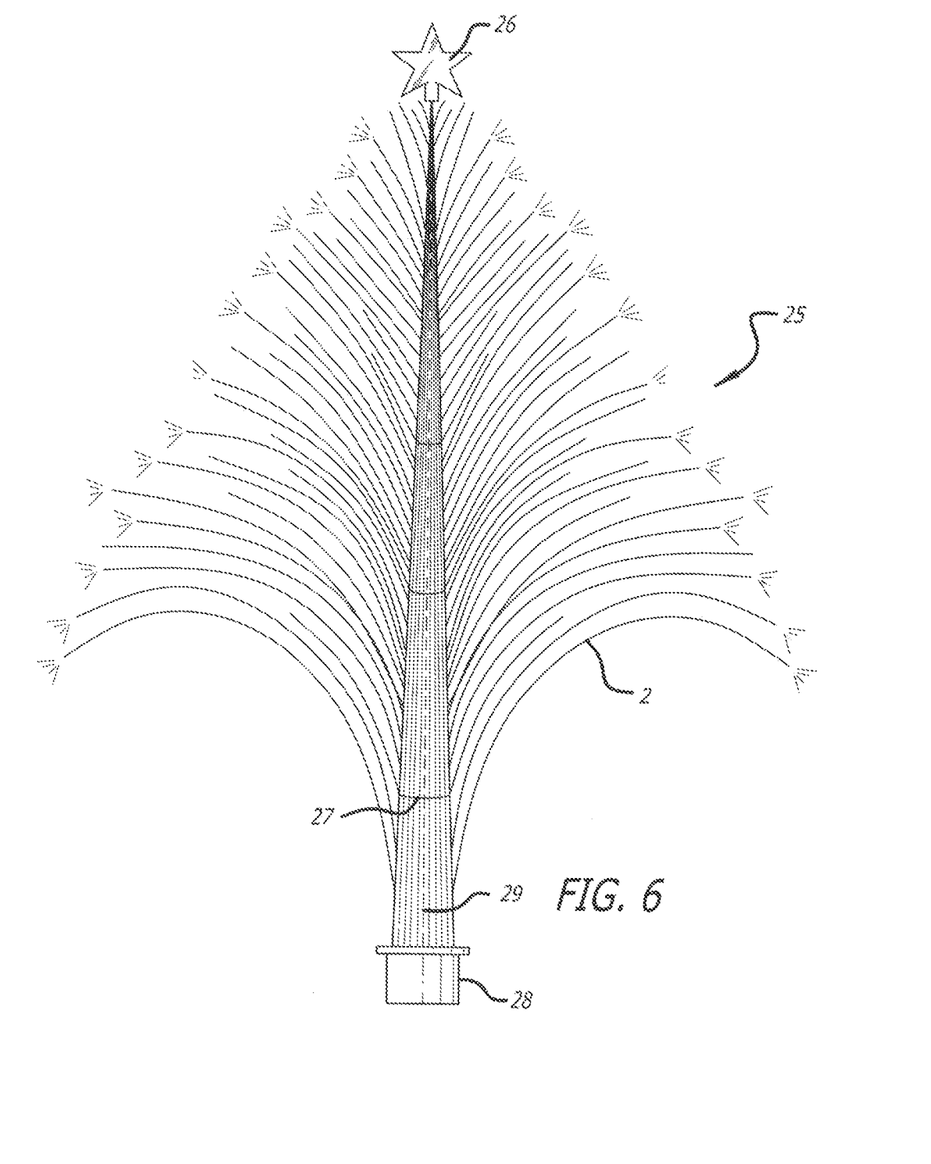
FIG. 6 illustrates a front side view of a Christmas tree decorative element.

FIG. 6 illustrates a Christmas tree decorative element (25). The tree (25) is made from a plurality of optical fibers (2) that branch out. The tree trunk (29) is made from a material that can be rolled. The rolling can be made in a spiral fashion such that the diameter of the trunk (29) decreases as the height of the tree (25) increases. The optical fibers (2) can arise from in between the spiral rolls (27). The bottom of the tree (25) is inserted into an annular receptor (28) that accepts the tree trunk (29) and the optical fibers (2) within. The annular receptor (28) can then be inserted into the tubular connector (22) having the plurality of light sources (23). The tree (25) can also have a separate decorative element (26), in this embodiment the shape of a star, which is transparent or translucent. The optical fibers (2) can travel up the tree (25) to its top and can light up the inside of the decorative element (26).

Figure 8:
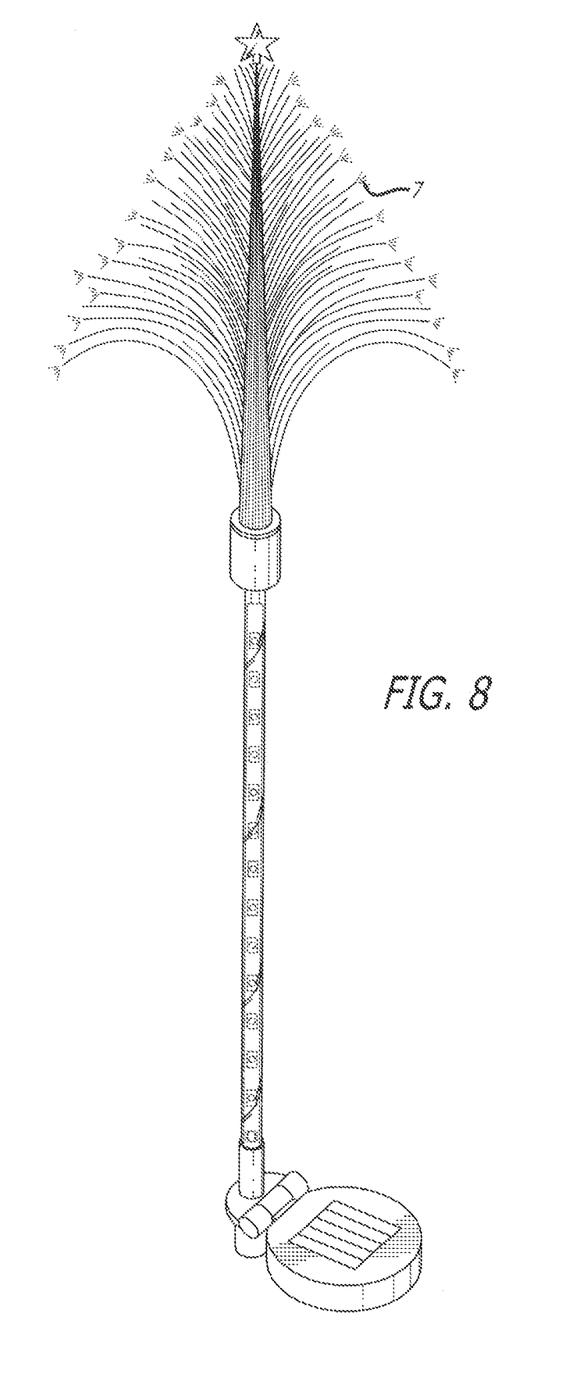
FIG. 8 illustrates the embodiment of FIG. 7 with the illumination of the Christmas tree decorative element.

FIGS. 7 and 8 illustrate an embodiment where the Christmas tree decorative element (25) is connected to the decorative lighting fixture of FIG. 2, here the tube (1) having a strip (14) with a plurality of strip light sources (15). The tubular connector (22), with the tree (25) inserted within, is connected to the top end of the tube (1) in lieu of the first connector (4). When the flash-controlled illumination (7) of the strip light sources (15) reaches the top of the tube body (1), the plurality of light sources (23) in the tubular connector (22) turn on and illuminate (7) the optical fibers (2) of the tree (25) as well as the star (26) of the tree.

FIG. 9 illustrates a solar panel housing (8) that is attached to the tube (1) via a second connector (11). The solar panel housing (8) has solar panels (9) for charging a rechargeable battery (40) that is contained within the solar panel housing (8).

FIG. 10 illustrates a bottom side of the solar panel housing (8) having an on-off switch (32) for turning on and off the decorative lighting fixture. Also illustrated is a stake tubular receptor (13) of the second connector (11) which receives a stake (30), as depicted in FIG. 12, which allows for attaching the decorative light fixture to the ground. In one embodiment, the entire fixture, or a substantial portion of the fixture, is made from a transparent or translucent tube (1), which eliminates or reduces the size of the opaque stake (30). The solar panel housing (8) can pivot against the tube (1) via a hinge (10). In another embodiment, the portion with the solar panel (9) allows for attaching an external source of electricity, such as a wire from an outlet, into an electrical port (33). A user (particularly in a showroom) can have the choice to power the decorative lighting fixture from an outlet, an external battery, or the rechargeable battery (40).

Figure 11:
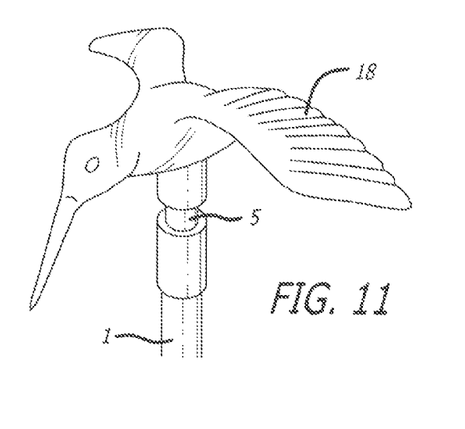
FIG. 11 illustrates a perspective view of a decorative element (here a bird, although other animals can be used) that is transparent or translucent.

FIG. 11 illustrates a decorative element (18), here in the form of a transparent or translucent bird, that can be attached to the first connector (4).

FIG. 12 illustrates a stake (30) having a piercing portion (31) for attaching the decorative light fixture to the ground.

Figure 13:
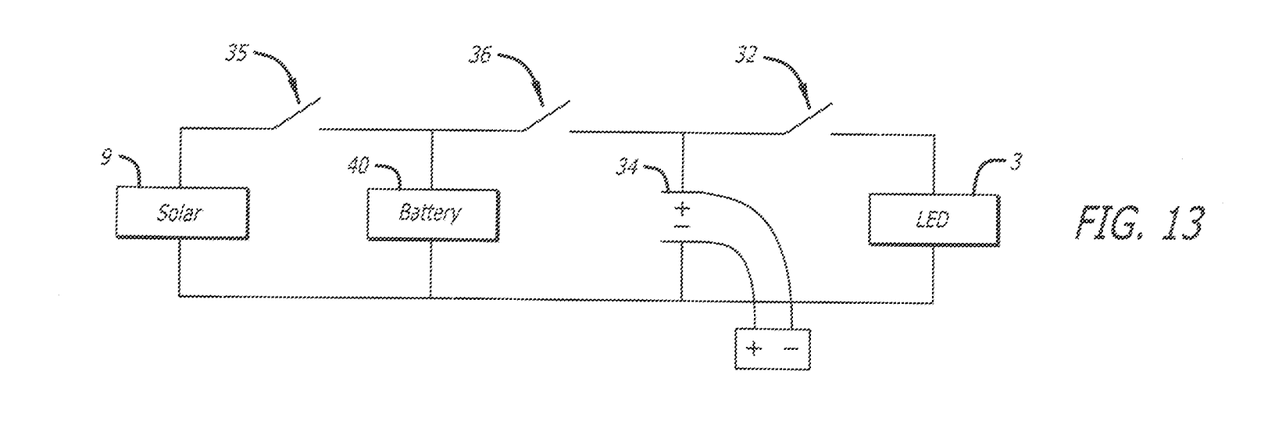
FIG. 13 is a circuit diagram of the control circuitry inside the solar panel housing.

FIG. 13 illustrates an exemplary circuit diagram of control circuitry in the solar panel housing (8). In the solar panel housing (8), there is provided solar panels (9), a rechargeable battery (40), and an optional connection to an external source of electricity (34) such as from an electrical outlet. The light source (3), such as a light-emitting diode (LED), at the top end of tube (1) is connected to the control circuitry. The flow of current is controlled by the on-off switch (32) and internal switches (35 and 36). In one embodiment, on-off switch (32) can be an internal switch. In another embodiment, on-off switch (32) can be an external killer switch.

On-off switch (32) can be controlled externally, while the states of internal switches (35 and 36) change depending on internal factors. For example, when there is no external source of electricity (34), internal switches 35 and/or 36 sense whether the solar panels (9) are detecting light and thus generating a voltage. If so, such as during the daytime, internal switch 35 closes, internal switch 36 opens, and the solar panels (9) recharge the rechargeable battery (40). In this setup, power will not flow to the light source (3). If the solar panels (9) do not sense light, such as during the night time, then the internal switch 35 opens, internal switch 36 closes, and power flows from the rechargeable battery (40) to the light source (3), assuming the on-off switch (32) is on. If the on-off switch (32) is off (open), power does not flow to the light source (3). On-off switch (32) can be on (closed) at all time if desired.

When an external source of electricity (34) is used, power is provided to the light source (3) from the external source of electricity (34) regardless of outside lighting conditions, assuming the on-off switch (32) is on. If internal switches (35) and/or (36) sense that there is an external source of electricity (34), such as by detecting its voltage, then internal switch (35) opens and disconnects the solar panels (9) from the circuit. In another embodiment, if internal switches (35) and/or (36) sense that the charge in the rechargeable battery (40) is low, then internal switch (36) closes so that the external source of electricity (34) can power the light source (3) and recharge the rechargeable battery (40). Alternatively, if the rechargeable battery (40) is not low, then internal switch (36) opens and disconnects the rechargeable battery (40) from the circuit.

Figure 14:
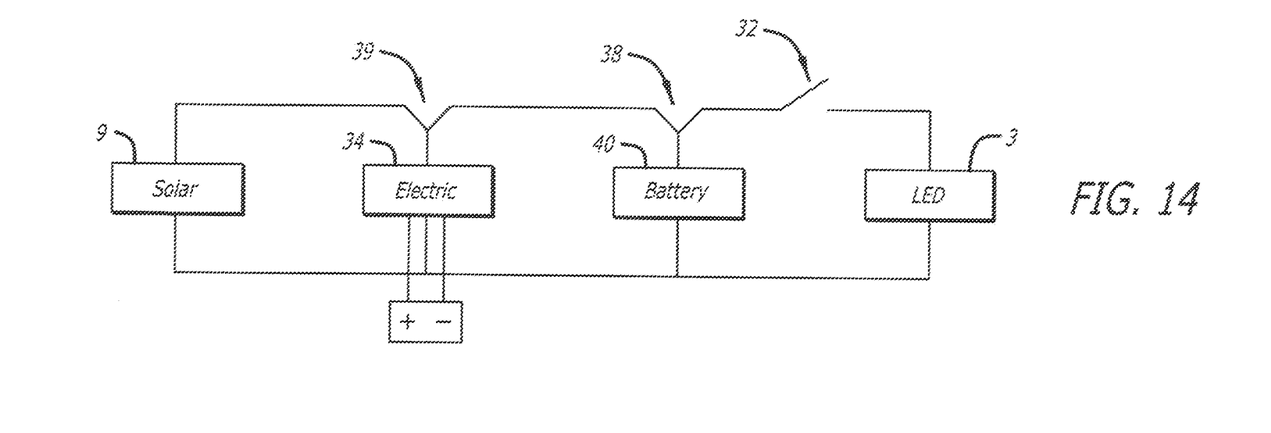
FIG. 14 is an alternative circuit diagram of the control circuitry inside the solar panel housing.

FIG. 14 illustrates an alternate embodiment of an exemplary circuit diagram of control circuitry in the solar panel housing (8). The circuit in FIG. 14 operates substantially similar to the circuit in FIG. 13, except that the positions of the rechargeable battery (40) and external source of electricity (34) are reversed, and internal switches (35) and (36) are replaced with internal dual switches (38) and (39).

On-off switch (32) can be controlled externally, while the states of internal dual switches (38 and 39) change depending on internal factors. For example, when there is no external source of electricity (34), internal dual switches 38 and/or 39 sense whether the solar panels (9) are detecting light and thus generating a voltage. If so, such as during the daytime, internal dual switch 39 forms a fully closed connection, internal dual switch (38) forms a closed connection to the rechargeable battery (40), and the solar panels (9) recharge the rechargeable battery (40). At the same time, assuming the on-off switch (32) is on (closed), internal dual switch (38) can form a closed connection to the light source (3), and power can flow from the solar panels (9) to the light source (3) resulting in lighting the light source (3) while recharging the rechargeable battery (40). Alternatively, internal dual switch (38) can form an open connection to the light source (3) so that power does not flow to the light source (3) and only recharges the rechargeable battery (40). If the solar panels (9) do not sense light, such as during the night time, then the internal dual switch (39) forms a fully open connection, internal dual switch (38) forms a closed connection to the light source (3), and power flows from the rechargeable battery (40) to the light source (3), assuming the on-off switch (32) is on. If the on-off switch (32) is off (open), power does not flow to the light source (3). On-off switch (32) can be on (closed) at all time if desired.

When an external source of electricity (34) is used, power can be provided to the light source (3) from the external source of electricity (34) regardless of outside lighting conditions, assuming the on-off switch (32) is on. If internal dual switches (38) and/or (39) sense that there is an external source of electricity (34), such as by detecting its voltage, then internal dual switch (39) forms a fully open connection and disconnects the solar panels (9) from the circuit. In one embodiment, if internal dual switches (38) and/or (39) sense that the charge in the rechargeable battery (40) is low, then internal dual switches (38 and 39) form a closed connection so that the external source of electricity (34) recharges only the rechargeable battery (40). Additionally, internal dual switch (38) can form a closed connection so that the external source of electricity (34) powers the light source (3) while recharging the rechargeable battery (40). Alternatively, if the rechargeable battery (40) is not low, then internal dual switch (38) forms a fully closed connection, disconnecting the rechargeable battery (40) from the circuit, and internal dual switch (39) forms a closed connection so that the external source of electricity only powers the light source (3).

What is claimed is:

1. A decorative light comprising:
   a. a transparent or translucent hollow tubular body having a top end and a bottom end;
   b. a strip having a plurality of spaced openings placed inside of the tubular body, the strip comprised of a plurality of first light sources attached to the strip;
   c. a solar panel;
   d. a rechargeable battery that is recharged by the solar panel, for powering the first light sources;
   e. a connector attached to the top end of the tubular body, the connector configured to receive a transparent or translucent decorative element placed at the top end of the tubular body;
   f. a second light source in electronic communication with the rechargeable battery attached to the connector, the second light source configured to illuminate the decorative element received by the connector, and
   g. a stake attached to the bottom end of the tubular body for making contact with a ground to hold the tubular body in position;
   wherein the openings are configured to allow each of the first light sources on the strip to be visible in opposite directions from opposite sides of the strip; and
   wherein light from the first light source travels from inside of the tubular body to outside of the tubular body.

2. The decorative light of claim 1, further comprising an integrated circuit chip for controlling the timing of both the first and the second light sources.

3. The decorative light of claim 1, wherein the second light source is hidden from view.

4. The decorative light of claim 1, further comprising receiving a transparent or translucent decorative element that is illuminated by the second light source at the connector.

5. The decorative light of claim 4, wherein the decorative element is an animal, a ball, or a snow flake.

6. The decorative light of claim 4, wherein the decorative element is a Christmas tree.

7. The decorative light of claim 6, wherein the tree is made from plurality of optical fibers that branch out.

8. The decorative light of claim 6, wherein the bottom of the tree is received by an annular receptor that accepts the trunk of the tree, with the optical fibers of the tree being in optical communication with a light source attached to a tubular connector placed at the top end of the tube.

9. The decorative light of claim 1, further comprising a port for receiving an external source of electricity.

10. The decorative light of claim 1, wherein a lighting effect is programmed to go from the bottom of the tube to the top of the tube in predetermined time intervals.

11. The decorative light of claim 1, wherein the second light source lights up after light reaches a top of the strip.

12. The decorative light of claim 1, wherein the second light source is directly attached to the strip as the last light source in electronic communication with the strip, the second light source placed in proximity to the connector instead of the strip, the communication of the second light source to the strip configured to lighten up the second light source in sequence after lighting of the previously spaced first light source on the strip.

* * * * *